(12) United States Patent
Wynalda et al.

(10) Patent No.: US 8,042,686 B2
(45) Date of Patent: Oct. 25, 2011

(54) MERCHANDISE STORAGE CONTAINER WITH TWO PULL OUT HOLDERS

(76) Inventors: Daniel Jay Wynalda, Belmont, MI (US); Robert G. Rajter, Jr., Rockford, MI (US)

(*) Notice: Subject to any disclaimer, the term of this patent is extended or adjusted under 35 U.S.C. 154(b) by 0 days.

(21) Appl. No.: 12/431,253

(22) Filed: Apr. 28, 2009

(65) Prior Publication Data

US 2010/0243490 A1    Sep. 30, 2010

Related U.S. Application Data

(60) Provisional application No. 61/164,406, filed on Mar. 28, 2009.

(51) Int. Cl.
 *B65D 85/30*  (2006.01)
(52) U.S. Cl. ........................ 206/308.1; 206/312; 206/531
(58) Field of Classification Search ............... 206/308.1, 206/312, 531
See application file for complete search history.

(56) References Cited

U.S. PATENT DOCUMENTS

| | | | |
|---|---|---|---|
| 4,488,644 A | 12/1984 | Wynalda, Jr. | |
| RE32,296 E | 11/1986 | Wynalda, Jr. | |
| 5,088,599 A | 2/1992 | Mahler | |
| 5,379,890 A | 1/1995 | Mahler | |
| 5,819,928 A | 10/1998 | Wynalda, Jr. | |
| 5,960,949 A | 10/1999 | Wynalda, Jr. | |
| 6,557,700 B1 * | 5/2003 | Wharton | 206/308.1 |
| 6,845,865 B2 | 1/2005 | Wynalda, Jr. | |
| 7,028,835 B1 | 4/2006 | Rajter | |
| 7,090,079 B2 * | 8/2006 | Ehrlund | 206/531 |
| 7,225,921 B2 | 6/2007 | Pelczarski | |
| 2006/0151343 A1 | 7/2006 | Cheung | |

* cited by examiner

*Primary Examiner* — Mickey Yu
*Assistant Examiner* — Rafael Ortiz
(74) *Attorney, Agent, or Firm* — Zollinger & Burleson Ltd.

(57) ABSTRACT

A merchandise storage container having a sleeve and a pair of pull out merchandise holders that are both stored in the same sleeve but may be pulled out to extended positions from opposite sides of the sleeve. The sleeve is configured to allow the two holders to be pulled out to their extended positions simultaneously. The sleeve is also configured to allow the holders to be pushed back to their retracted positioned simultaneously without interfering with one another. The sleeve is configured to prevent the holders from jamming during the operation of the container.

19 Claims, 4 Drawing Sheets

MERCHANDISE STORAGE CONTAINER WITH TWO PULL OUT HOLDERS

CROSS REFERENCE TO RELATED APPLICATIONS

This application claims the benefit of U.S. Provisional Patent application Ser. No. 61/164,406 filed Mar. 28, 2009; the disclosures of which are incorporated herein by reference.

BACKGROUND OF THE INVENTION

1. Technical Field

The present invention relates generally to merchandise storage containers and, more particularly, to a merchandise storage container having a pair of merchandise holders that may be pulled out of opposite sides of a sleeve.

2. Background Information

Various storage containers are known in the art. Some retailers and customers desire a merchandise storage container manufactured entirely from recycled paper and recyclable paper. In order to serve this market, merchandise storage containers have been designed entirely from recyclable paperboard such as the container depicted in FIGS. 1-8 of US-2008-0017536-A1. Additional configurations recyclable paperboard containers are desired in the marketplace.

BRIEF SUMMARY OF THE INVENTION

The invention provides a merchandise storage container having a sleeve and a pair of pull out merchandise holders that are both stored in the same sleeve but may be pulled out to extended positions from opposite sides of the sleeve. The sleeve is configured to allow the two holders to be pulled out to their extended positions simultaneously. The sleeve is also configured to allow the holders to be pushed back to their retracted positioned simultaneously without interfering with one another. The sleeve is configured to prevent the holders from jamming during the operation of the container.

In one configuration, the entire container is fabricated from a recyclable material. The material may be a paper-based material.

In one configuration, the holders and sleeve of the container include anchors that remain disposed inside the sleeve when the holders are extended to prevent the holders from being readily removed from the sleeve.

These configurations are provided individually and in combination with one another to form additional configurations. Examples of the invention are described below. The invention is defined by the claims.

BRIEF DESCRIPTION OF THE SEVERAL VIEWS OF THE DRAWINGS

Similar numbers refer to similar parts throughout the specification.

DETAILED DESCRIPTION OF THE INVENTION

A first configuration of the merchandise storage container is indicated generally by the numeral 2 in the accompanying drawings. The first configuration of container 2 includes an outer sleeve 4 and a pair of internal merchandise holders 6 that move between retracted (FIG. 1) and extended (FIGS. 2 and 3) positions.

Figure 2:
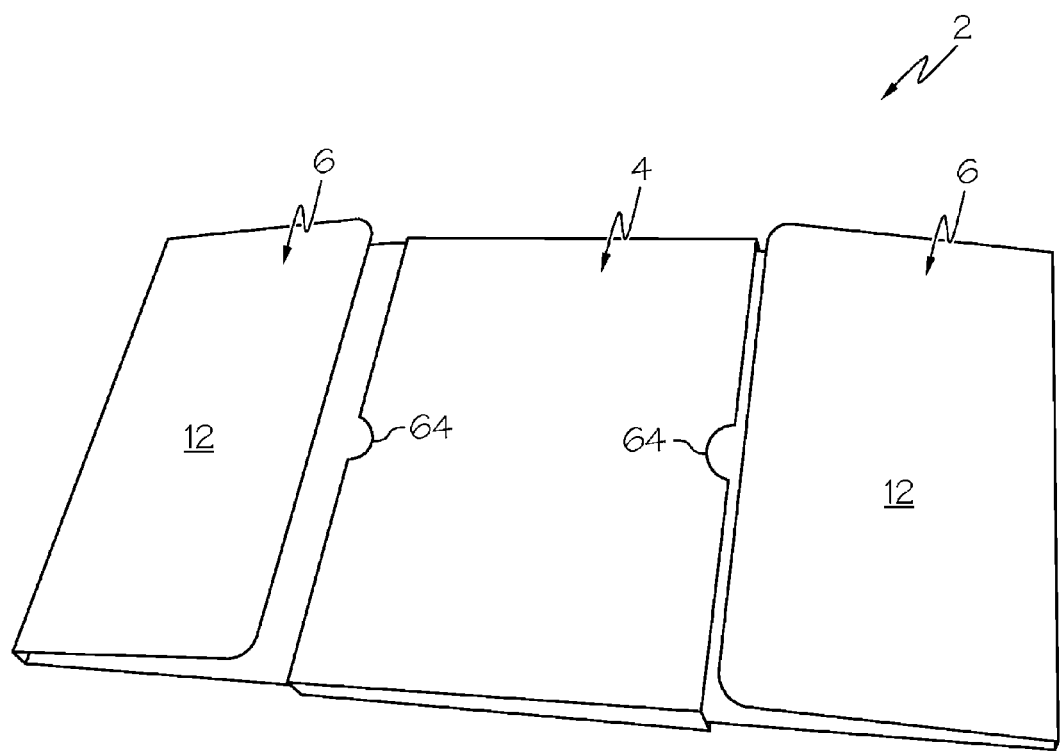
FIG. 2 is a perspective view of a merchandise storage container with the holders disposed in their extended positions with their covers closed.
Figure 3:
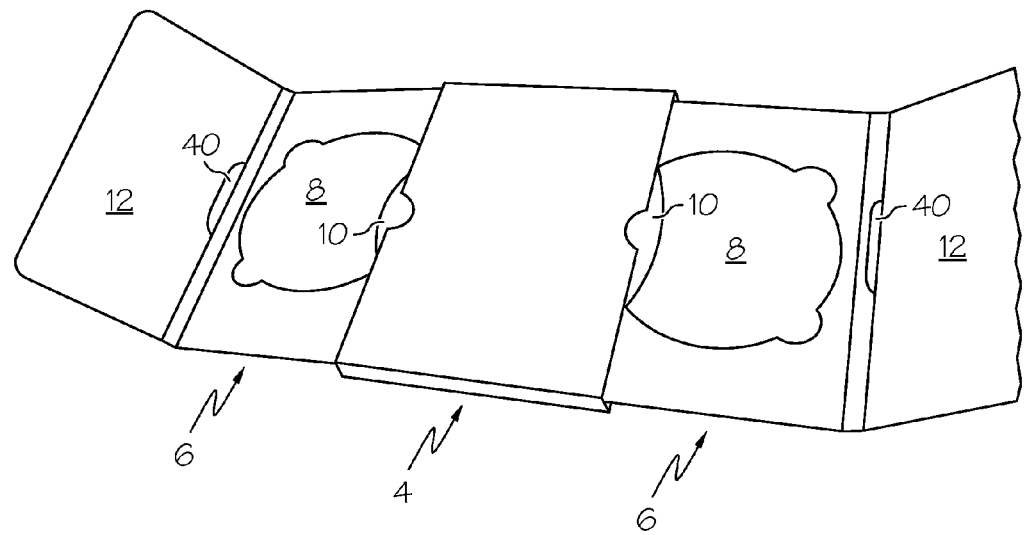
FIG. 3 is a perspective view of a merchandise storage container with the holders disposed in their extended positions with their covers open.
Figure 4:
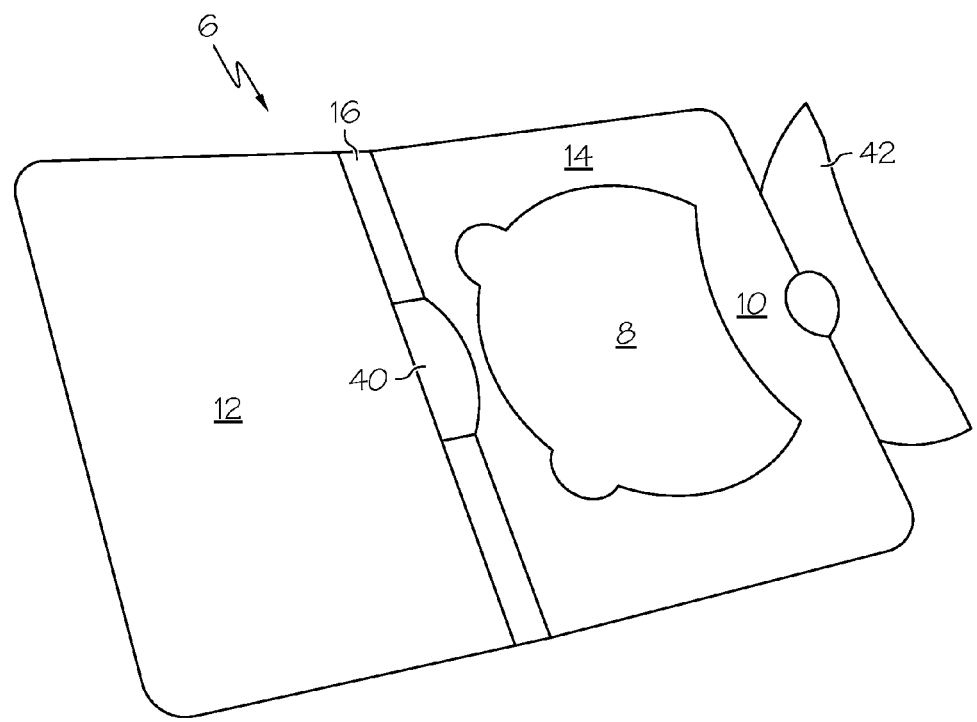
FIG. 4 is a top view of one of the holders removed from the sleeve.
Figure 5:
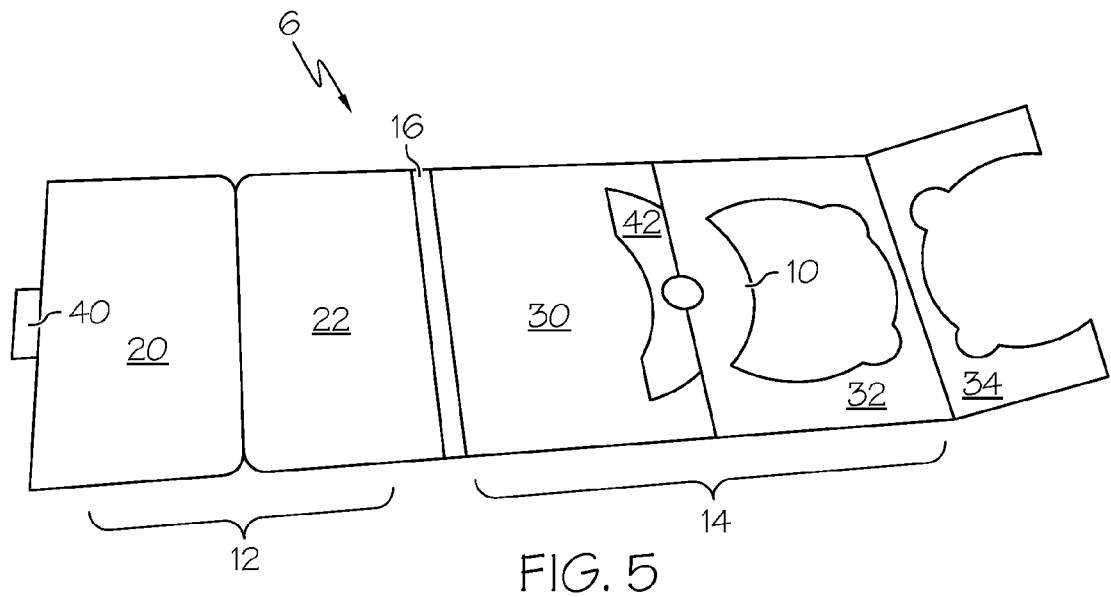
FIG. 5 is a top plan view of the blank used to make the holder of FIG. 4.

Sleeve 4 and holders 6 are configured such that holders 6 may be moved simultaneously into and out of sleeve 4 without interfering with each other. When both holders 6 are extended as shown in FIGS. 2 and 3, sleeve 4 is disposed between holders 6 because holders 6 extend from opposite sides or ends of sleeve 4.

Holders 6 may be configured to hold various items of merchandise. In the exemplary configurations shown in the drawings, each holder 6 is configured to hold a media disc such as a recorded or recordable disc, a DVD, a CD, or a UMD. Holders 6 may be configured to hold other items of merchandise such as batteries, gift cards, medicine, electronics, and the like. In the exemplary configuration, holders 6 define pockets 8 that hold media discs in an interference fit with a lip 10 disposed over a portion of pocket 8. In other configurations, holders 6 may include disc hubs that snap through the central opening of the media disc. When holders 6 are configured to hold other items of merchandise, the bodies of holders 6 may be configured with pockets or storage chambers configured for the particular item of merchandise being used with container 2.

Each holder 6 may have an optional cover 12 that pivots between closed and open positions. Each cover 12 is connected to the base 14 of holder 6 with a spine wall 16. Cover 12 may be formed from inner 20 and outer 22 cover panels. Base 14 may be formed from outer 30, inner 32, and intermediate 34 panels that cooperate to define pocket 8 and lip 10. A hold down tab 40 may extend from panel 20 to a position adjacent pocket 8 to help hold the media disc within pocket 8 when cover 12 is closed. Tab 40 may be configured to extend over a portion of pocket 8 when cover 12 is open to help hold the merchandise in or on holder 6. A locking flange 42 extends from base 14. Locking flange cooperates with a complementary flange 44 on sleeve 4 to prevent holder 6 from being pulled all the way out of sleeve 4.

Figure 6:
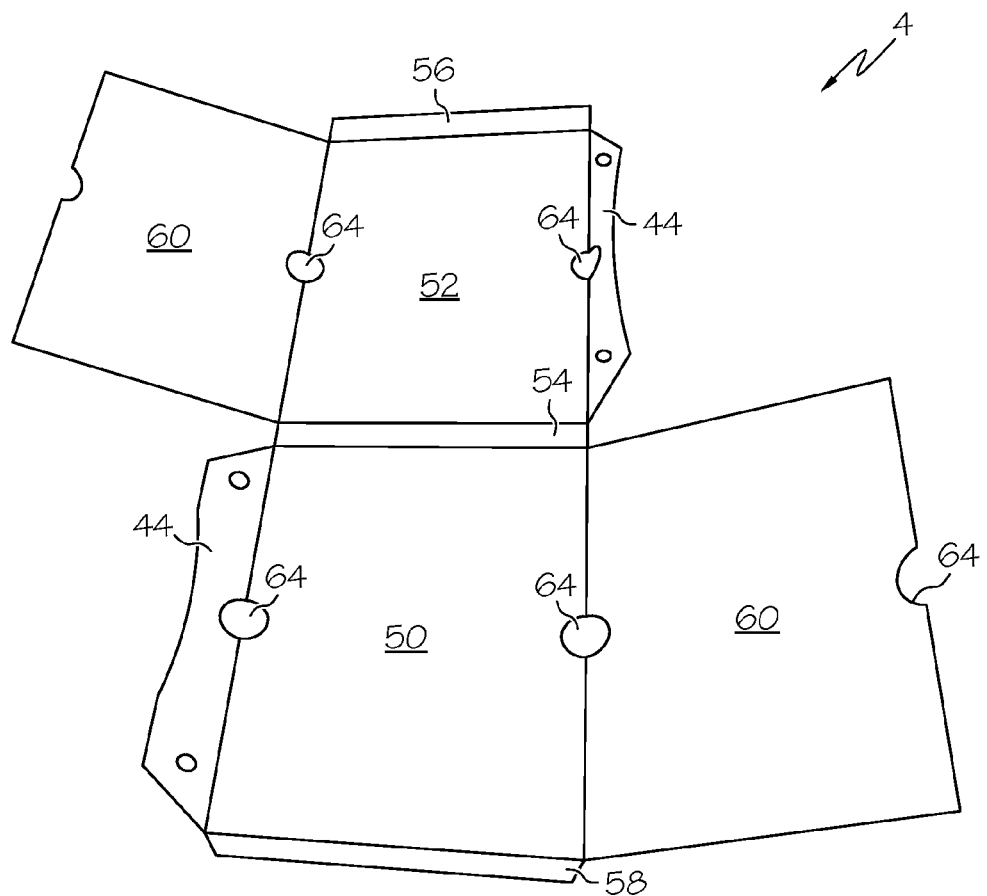
FIG. 6 is a top plan view of the blank used to make the sleeve.
Figure 7:
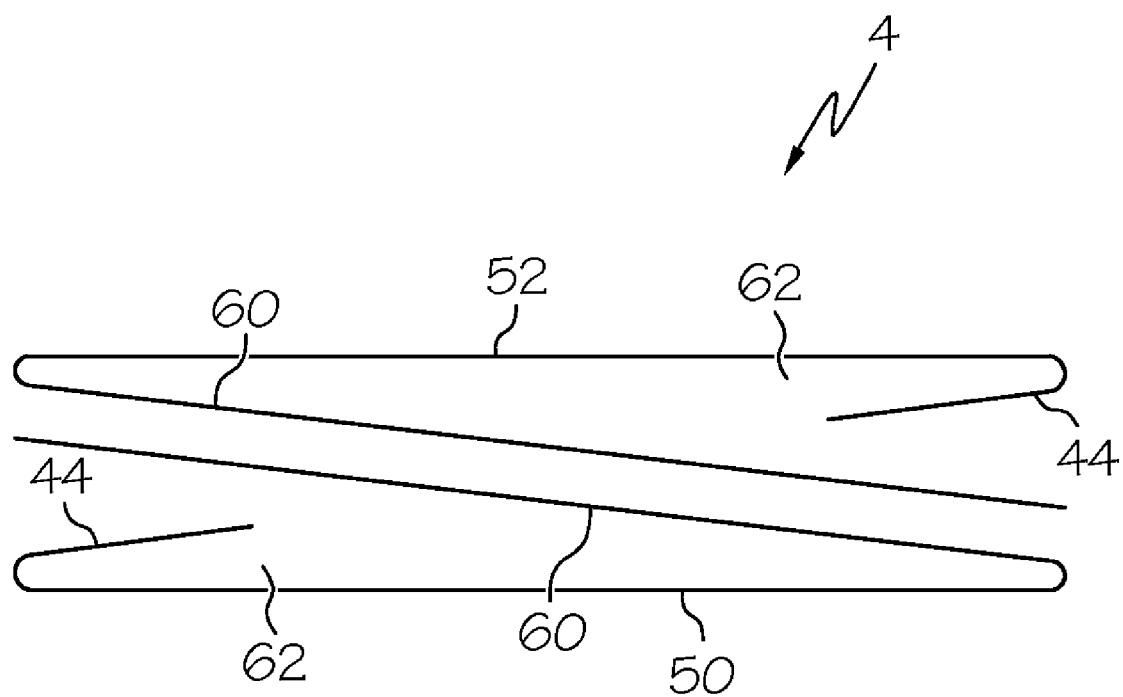
FIG. 7 is a schematic section view taken through the sleeve.

FIG. 6 depicts the blank used to form outer sleeve 4. The blank may be cut or punched from material stock, folded along the lines depicted in FIG. 6, and glued, stapled, or otherwise secured with a mechanical connector to form sleeve 4. FIG. 6 shows the two locking flanges 44 of sleeve 4 that retain holders 6 to tray 4 when holders 6 are in their extended positions.

Sleeve 4 is formed from a bottom panel 50, a top panel 52, an upper end panel 54, a lower end panel 56, a connecting flange 58, the pair of locking flanges 44 described above, and at least one separation panel 60. These panels are folded into the configuration shown in FIGS. 1-3 with locking flanges 44 disposed inside sleeve 4. In the exemplary configuration of container 2, a pair of separation panels 60 are used to define the chambers 62 that receive holders 6 when holders 6 are in their retracted positions such that panels 60 are directly between holders 6.

Separation panels 60 are sized to cover a majority of panels 50 and 52 and may be sized to cover over eighty percent of the surface area of panels 50 and 52. When folded over to opposed configurations with respect to panels 50 and 52, panels 60 are positioned to be disposed against each other when sleeve 4 is formed. Panels 60 may overlap locking flanges 44. Panels 60 and their respective panels 50/52 define two substantially independent chambers 62 within sleeve 4 for receiving holders 6. The end of each chamber 62 is defined by an end wall defined by the fold or a plurality of folds between panel 60 and panel 50/52. These end walls prevent holders 6 from being pushed through sleeve 4.

In alternate configurations, panels 60 need only be large enough to overlap each other to define the independent chambers 62 for holders 6.

Locking flanges 44 extend into chambers 62 in order to interact with flanges 42 on holders 6. Panels 60 allow holders 6 to be moved into and out of sleeve 4 at the same time because each holder 60 is disposed in its own chamber and does not slide against the other holder 6.

Figure 1:
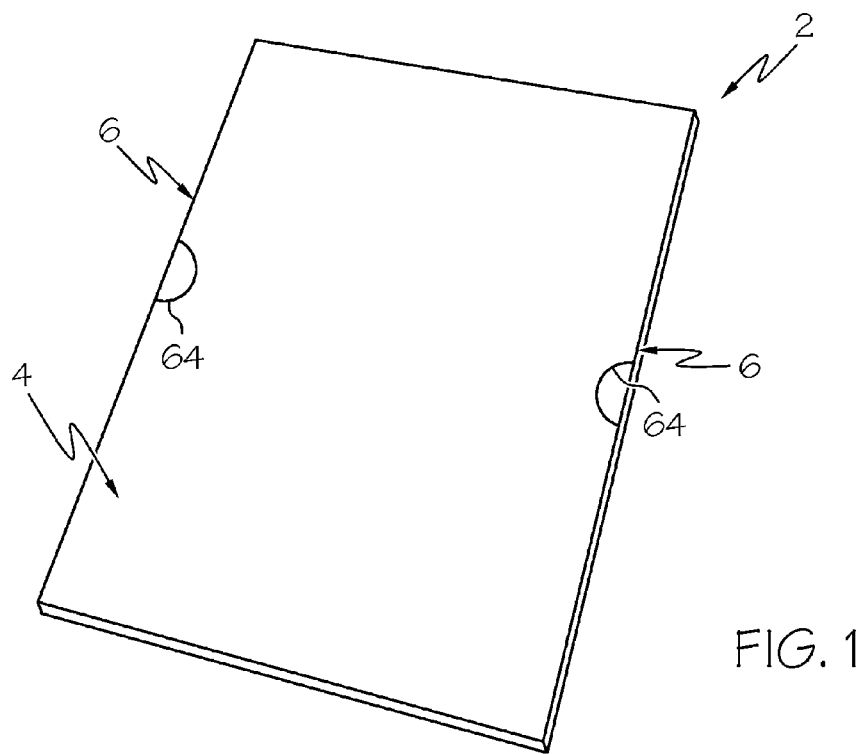
FIG. 1 is a perspective view of a merchandise storage container with the holders disposed in their retracted positions within the outer sleeve.

The panels defining the lateral edges of sleeve 4 define aligned finger access notches 64 that allow the user to grasp holders 6 when holders 6 are in the retracted positions as shown in FIG. 1.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A merchandise storage container comprising:
   an outer sleeve having opposite sides; the outer sleeve including top and bottom panels and upper and lower end panels; each end panel connecting the top panel to the bottom panel; each of the top and bottom panels having opposite edges;
   a first merchandise holder carried by the sleeve and selectively movable between retracted and extended positions; at least a majority of the holder being disposed within the sleeve when the holder is in the retracted position;
   a second merchandise holder carried by the sleeve and selectively movable between retracted and extended positions; at least a majority of the holder being disposed within the sleeve when the holder is in the retracted position;
   the sleeve includes a pair of separation panels disposed between the first and second merchandise holders when the first and second merchandise holders are disposed in their retracted positions;
   one of the separation panels being connected to the top panel with a living hinge to define a first chamber and the other of the separation panels being connected to the bottom panel with a living hinge to define a second chamber;
   each of the separation panels being pivotable within the sleeve between the upper and lower end panels; and
   the sleeve being disposed between the first and second merchandise holders when the first and second merchandise holders are disposed in their extended positions.

2. The container of claim 1, wherein each of the holders has a cover that is selectively pivotable between open and closed positions.

3. The container of claim 2, wherein the cover includes a hold down tab that extends across a portion of the holder when the cover is in the open position.

4. The container of claim 1, wherein one of the separation panels is connected to a first edge of the top panel and a locking flange is connected to a second edge of the top panel; the locking flange extending into the sleeve; and the separation panel overlapping the locking flange.

5. The container of claim 4, wherein the other of the separation panels is connected to a first edge of the bottom panel and a locking flange is connected to a second edge of the bottom panel; the locking flange extending into the sleeve; and the separation panel overlapping the locking flange.

6. The container of claim 5, wherein each of the holders has a locking flange; the locking flanges of the holders are engaged with the locking flanges of the sleeve when the holders are in their extended position.

7. The container of claim 5, wherein each of the holders defines a pocket adapted to hold a media disc.

8. The container of claim 7, wherein each of the holders includes a lip disposed over a portion of the pocket.

9. The container of claim 8, wherein each of the holders includes a cover selectively movable between open and closed positions.

10. The container of claim 1, wherein one of the end panels is formed from the combination of a panel overlapped with a flange.

11. A merchandise storage container comprising:
    an outer sleeve having opposite sides; the outer sleeve including top and bottom panels; each of the top and bottom panels having opposite edges and top and bottom ends;
    the sleeve further having upper and lower end panels; the upper end panel connecting the top end of the top panel to the top end of the bottom panel; the bottom end panel connecting the bottom end of the top panel to the bottom end of the bottom panel;
    a first merchandise holder carried by the sleeve and selectively movable between retracted and extended positions; at least a majority of the holder being disposed within the sleeve when the holder is in the retracted position;
    a second merchandise holder carried by the sleeve and selectively movable between retracted and extended positions; at least a majority of the holder being disposed within the sleeve when the holder is in the retracted position;
    the sleeve having first and second separation panels that completely separate the first merchandise holder from the second merchandise holder when the first and second merchandise holders are disposed in their retracted positions;
    the first and second separation panels being disposed inward of the end panels and free of connections with the end panels;
    the first separation panel being connected to a first edge of the top panel to define a chamber for the first merchandise holder; a first locking flange being connected to a second edge of the top panel; the first locking flange extending into the sleeve; the first separation panel overlapping the first locking flange;
    the second separation panel being connected to a first edge of the bottom panel to define a chamber for the second merchandise holder; a second locking flange being connected to a second edge of the bottom panel; the second locking flange extending into the sleeve; the second separation panel overlapping the locking flange;

each of the first and second merchandise holders having a locking flange; the locking flanges of the holders being engaged with the locking flanges of the sleeve when the first and second merchandise holders are in their extended position; and the sleeve being disposed between the first and second merchandise holders when the first and second merchandise holders are disposed in their extended positions.

12. The container of claim 11, wherein each of the holders defines a pocket adapted to hold a media disc.

13. The container of claim 12, wherein each of the holders includes a lip disposed over a portion of the pocket.

14. The container of claim 13, wherein each of the holders includes a cover selectively movable between open and closed positions.

15. The container of claim 11, wherein one of the end panels is formed from the combination of a panel overlapped with a flange.

16. A merchandise storage container comprising:

an outer sleeve including top and bottom panels and first and second end panels; each end panel connecting the top panel to the bottom panel;

each of the top and bottom panels having opposite first and second edges and opposite third and fourth edges;

a first merchandise holder carried by the sleeve and selectively movable between retracted and extended positions; at least a majority of the holder being disposed within the sleeve when the holder is in the retracted position;

a second merchandise holder carried by the sleeve and selectively movable between retracted and extended positions; at least a majority of the holder being disposed within the sleeve when the holder is in the retracted position;

the outer sleeve including first and second separation panels disposed between the first and second merchandise holders when the first and second merchandise holders are disposed in their retracted positions;

the first separation panel being connected to the first edge of the top panel; the first separation panel being disposed inwardly of and not connected to the end panels;

the second separation panel being connected to the second edge of the bottom panel; the second separation panel being disposed inwardly of and not connected to the end panels; and the sleeve being disposed between the first and second merchandise holders when the first and second merchandise holders are disposed in their extended positions.

17. The container of claim 16, wherein one of the end panels is formed from the combination of a panel overlapped with a flange.

18. The container of claim 17, further comprising a first locking flange connected to the second edge of the top panel and a second locking flange connected to the first edge of the bottom panel.

19. The container of claim 18, wherein the first locking flange extending into the sleeve and overlaps the first separation panel.

* * * * *